(12) United States Patent
Shim et al.

(10) Patent No.: US 12,469,881 B2
(45) Date of Patent: Nov. 11, 2025

(54) ELECTROLYTIC SOLUTION FOR SECONDARY BATTERY AND LITHIUM SECONDARY BATTERY INCLUDING THE SAME

(71) Applicant: SK On Co., Ltd., Seoul (KR)

(72) Inventors: You Jin Shim, Daejeon (KR); Yu Na Shim, Daejeon (KR)

(73) Assignee: SK On Co., Ltd., Seoul (KR)

(*) Notice: Subject to any disclaimer, the term of this patent is extended or adjusted under 35 U.S.C. 154(b) by 672 days.

(21) Appl. No.: 17/851,262

(22) Filed: Jun. 28, 2022

(65) Prior Publication Data

US 2023/0013903 A1    Jan. 19, 2023

(30) Foreign Application Priority Data

Jun. 29, 2021   (KR) .......... 10-2021-0084831

(51) Int. Cl.
| | |
|---|---|
| *H01M 10/0567* | (2010.01) |
| *H01M 10/0525* | (2010.01) |
| *H01M 10/0568* | (2010.01) |
| *H01M 10/0569* | (2010.01) |
| H01M 4/02 | (2006.01) |
| H01M 4/505 | (2010.01) |
| H01M 4/525 | (2010.01) |

(52) U.S. Cl.
CPC ... *H01M 10/0567* (2013.01); *H01M 10/0525* (2013.01); *H01M 2004/028* (2013.01); *H01M 4/505* (2013.01); *H01M 4/525* (2013.01); *H01M 10/0568* (2013.01); *H01M 10/0569* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 9,640,839 B2 | 5/2017 | Porta Garcia et al. | |
| 9,929,437 B2 | 3/2018 | Garsuch et al. | |
| 2004/0110068 A1* | 6/2004 | Seki ............... | H01M 4/525 |
| | | | 429/162 |
| 2009/0280414 A1 | 11/2009 | Koh et al. | |
| 2018/0198163 A1 | 7/2018 | Sekine et al. | |
| 2019/0386338 A1 | 12/2019 | Kawai et al. | |
| 2020/0044279 A1* | 2/2020 | Park ............... | H01M 10/0567 |
| 2020/0251780 A1 | 8/2020 | Park et al. | |
| 2020/0259209 A1 | 8/2020 | Park et al. | |

FOREIGN PATENT DOCUMENTS

| | | |
|---|---|---|
| EP | 1406338 A1 | 4/2004 |
| EP | 3691017 A2 | 8/2020 |
| EP | 3696901 A1 | 8/2020 |
| JP | 2017183067 A | 10/2017 |
| KR | 1020160033718 A | 3/2016 |
| KR | 1020160145055 A | 12/2016 |
| KR | 1020180025917 A | 3/2018 |
| WO | 2008035928 A1 | 3/2008 |

* cited by examiner

*Primary Examiner* — Nathanael T Zemui
(74) *Attorney, Agent, or Firm* — The Webb Law Firm

(57) ABSTRACT

The present disclosure relates to an electrolytic solution for a secondary battery and a lithium secondary battery employing the same. The electrolytic solution for a secondary battery of the present disclosure contains a sulfonyl compound, such that a lithium secondary battery employing a high content of nickel for a cathode has significantly improved quick charge characteristics, room temperature lifespan characteristics, and low-temperature characteristics.

13 Claims, No Drawings

ELECTROLYTIC SOLUTION FOR SECONDARY BATTERY AND LITHIUM SECONDARY BATTERY INCLUDING THE SAME

CROSS-REFERENCE TO RELATED APPLICATION

This application claims priority to Korean Patent Application No. 10-2021-0084831 filed Jun. 29, 2021, the disclosure of which is hereby incorporated by reference in its entirety.

BACKGROUND OF THE INVENTION

Field of the Invention

The following disclosure relates to an electrolytic solution for a secondary battery and a lithium secondary battery including the same, and more particularly, to an electrolytic solution for a secondary battery that contains a sulfonyl compound having a specific structure, and a lithium secondary battery employing the same.

Description of Related Art

Recently, as an industrial environment is changed to pursue energy, studies on a new energy source have been intensively conducted.

As such an energy source, a lithium secondary battery already has been efficiently used as a power supply for mobile devices such as a smart phone and a laptop computer or electric vehicles because it has a high energy density and low self-discharge.

The lithium secondary battery includes a lithium salt which is an electrolyte and a non-aqueous solvent-based electrolytic solution. It is required for the non-aqueous solvent to have a high dielectric and high ion conductivity in a wide temperature range in order to dissolve the lithium salt.

In order to satisfy these requirements, a solvent obtained by mixing a high boiling point solvent such as propylene carbonate or ethylene carbonate with a low boiling point solvent such as dimethyl carbonate or diethyl carbonate has been used.

In addition, an electrolytic solution to which various additives are added has been used to improve an initial capacity, cycle characteristics, high-temperature storage characteristics, low-temperature characteristics, self-discharge characteristics, over-charge characteristics, and the like of the lithium secondary battery.

However, in order for the lithium secondary battery to be used as a main power source or an auxiliary power source of an electric vehicle or a hybrid vehicle, it is required for the lithium secondary battery not only to exhibit a high performance but also to have a high energy density for a stable supply of power.

When an operating voltage range is widened while using an additive for an electrolytic solution according to the related art for a high voltage lithium secondary battery as it is, internal resistance and a lifespan of the battery are rapidly reduced.

That is, when a general electrolytic solution according to the related art is used, battery characteristics are excellent at a voltage of 4.2 V or lower; however, a battery performance deteriorates as the voltage is increased at a voltage of 4.2 V or higher.

Therefore, development of a material for an electrolyte having excellent voltage resistance even at a high voltage is required.

As an example, in order to solve such problems, U.S. Patent Application Publication No. 2019-0386338 discloses a lithium secondary battery having improved electrical properties and durability.

However, there is still a need for studies on an electrolytic solution for a secondary battery capable of improving electrical properties of the secondary battery at a high voltage and a high voltage lithium secondary battery including the same.

SUMMARY OF THE INVENTION

An embodiment of the present disclosure is directed to providing an electrolytic solution for a secondary battery capable of significantly improving high-rate charge and discharge characteristics, lifespan characteristics, quick charge characteristics, and high-temperature storage stability of the secondary battery, and a lithium secondary battery including the same.

In one general aspect, an electrolytic solution for a secondary battery contains
a lithium salt,
a non-aqueous organic solvent, and
a sulfonyl compound represented by the following Chemical Formula 1:

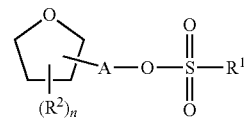

[Chemical Formula 1]

wherein
A is C1-C5 alkylene or C2-C5 alkenylene;
$R^1$ is C1-C10 alkyl, C2-C10 alkenyl, C6-C12 aryl, or C6-C12 aryl C1-C10 alkyl;
$R^2$ is halogen, C1-C5 alkyl, or halo C1-C5 alkyl; and
n is an integer of 0 to 3.

In Chemical Formula 1, A may be C1-C5 alkylene; $R^1$ may be C1-C10 alkyl, C6-C12 aryl, or C6-C12 aryl C1-C10 alkyl; $R^2$ may be fluoro, C1-C5 alkyl, or fluoro C1-C5 alkyl; and n may be an integer of 0 or 1. More specifically, the sulfonyl compound represented by Chemical Formula 1 may be represented by the following Chemical Formula 2:

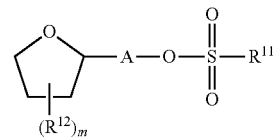

[Chemical Formula 2]

wherein
A is C1-C5 alkylene;
$R^{11}$ is C1-C10 alkyl or C6-C12 aryl C1-C10 alkyl;
$R^{12}$ is halogen, C1-C5 alkyl, or halo C1-C5 alkyl; and
m is an integer of 0 to 3.

In terms of further improving quick charge characteristics, lifespan characteristics, and high-temperature storage stability, in Chemical Formula 2, A may be C1-C3 alkylene;

$R^{11}$ may be C1-C6 alkyl or C6-C12 aryl C1-C6 alkyl; $R^{12}$ may be fluoro, C1-C5 alkyl, or fluoro C1-C5 alkyl; and m may be an integer of 0 or 1.

More specifically, the sulfonyl compound may be selected from, but is not limited to, the following compounds:

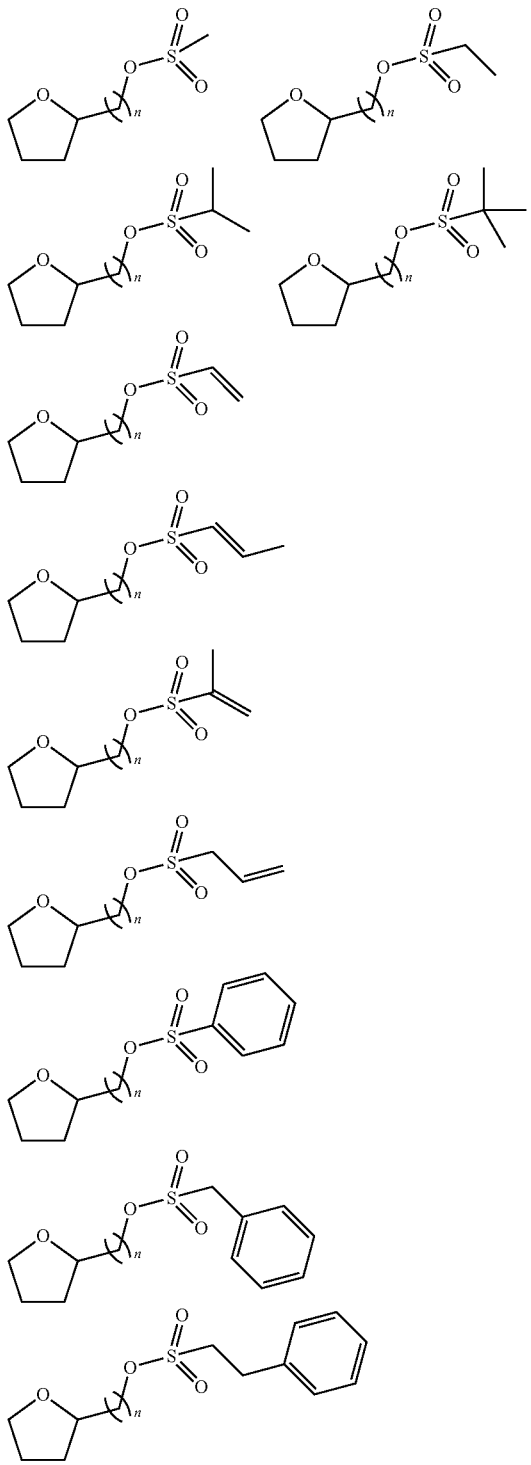

wherein n is an integer of 0 to 5.

The sulfonyl compound may be contained in an amount of 0.1 to 5 wt % with respect to a total weight of the electrolytic solution.

The electrolytic solution may further contain a sultone compound represented by the following Chemical Formula 3 and a fluorine-substituted carbonate-based compound as additives:

[Chemical Formula 3]

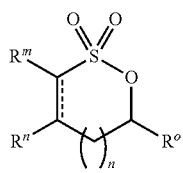

wherein === represents a single bond or a double bond;
$R^m$ to $R^o$ are each independently hydrogen, halogen, C1-C10 alkyl, C2-C10 alkenyl, halo C1-C10 alkyl, halo C2-C10 alkenyl, or C6-C12 aryl; and
n is an integer of 0 to 3.

The sultone compound may be one or more selected from 1,3-propane sultone, 1,4-butane sultone, ethene sultone, 1,3-propene sultone, 3-fluoro-1,3-propane sultone, and 1,4-butene sultone, and the fluorine-substituted carbonate-based compound may be one or more selected from fluoroethylene carbonate, difluoroethylene carbonate, fluorodimethyl carbonate, and fluoroethylmethyl carbonate.

The additive may be contained in an amount of 0.1 to 5 wt % with respect to a total weight of the electrolytic solution.

The electrolytic solution may further contain one or two or more additives selected from the group consisting of an oxalatoborate-based compound, an oxalatophosphate-based compound, and a vinylidene carbonate-based compound, and the lithium salt may be one or two or more selected from the group consisting of $LiPF_6$, $LiBF_4$, $LiClO_4$, $LiSbF_6$, $LiAsF_6$, $LiN(SO_3C_2F_5)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$.

In another general aspect, a lithium secondary battery includes a cathode including a nickel-cobalt-manganese-based cathode active material containing the following Chemical Formula 11, the following Chemical Formula 12, or a mixture thereof, an anode, a separator interposed between the cathode and the anode, and the electrolytic solution for a secondary battery:

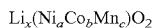    Chemical Formula 11 wherein $0.5<x<1.3$, $0.8 \le a<1$, $0<b<1$, $0<c<1$, and $a+b+c=1$,

    Chemical Formula 12 wherein $0.5<x<1.3$, $0.8<a<2$, $0<b<2$, $0<c<2$, and $a+b+c=2$.

The cathode active material may be $Li_x(Ni_aCo_bMn_c)O_2$ in which $0.95 \le x \le 1.10$, $0.8 \le a<0.9$, and $a+b+c=1$.

DESCRIPTION OF THE INVENTION

Hereinafter, the present disclosure will be described in more detail. Unless otherwise defined, all the technical terms and scientific terms used herein have the general meanings as commonly understood by those skilled in the art to which the present disclosure pertains, and the description for the known function and configuration unnecessarily obscuring the gist of the present disclosure will be omitted in the following description.

The term "alkyl" described in the present disclosure refers to an aliphatic hydrocarbon group having 1 to 10 carbon atoms, 1 to 8 carbon atoms, 1 to 5 carbon atoms, or 1 to 4 carbon atoms. The alkyl used alone or in combination may be linear or branched alkyl. Specific examples of the linear or branched alkyl may include methyl, ethyl, n-propyl, isopropyl, n-butyl, isobutyl, tert-butyl, n-pentyl, neopentyl, n-hexyl, isohexyl, n-heptyl, n-octyl, n-nonyl, and n-decyl.

The term "alkenyl" used herein refers to an unsaturated alkyl group that has at least one double bond and 2 to 10 carbon atoms, specifically, 2 to 8 carbon atoms, more specifically, 2 to 5 carbon atoms, and still more specifically, 2 to 4 carbon atoms, and is attached to the rest of the molecule by a single bond, and examples thereof include ethenyl, 1-propenyl, 2-propenyl, 1-butenyl, 2-butenyl, 1-pentenyl, 2-pentenyl, 1-hexenyl, and 2-hexenyl.

The term "aryl" used herein refers to a carbocyclic aromatic group containing 5 to 10 ring atoms. Representative examples thereof include, but are not limited to, phenyl, tolyl, xylyl, naphthyl, tetrahydronaphthyl, anthracenyl, fluorenyl, indenyl, and azulenyl. The carbocyclic aromatic group may be selectively substituted.

The term "alkylene" used herein refers to a linear or branched divalent hydrocarbon group that is composed of only a single bond of carbon and hydrogen and links the rest of the molecule to a radical group.

The term "alkenylene" used herein refers to an unsaturated divalent hydrocarbon group that has at least one double bond and 2 to 10 carbon atoms, specifically, 2 to 8 carbon atoms, more specifically, 2 to 5 carbon atoms, and still more specifically, 2 to 4 carbon atoms, and is attached to the rest of the molecule by a single bond.

The term "halogen" or "halo" used herein refers to fluorine, chlorine, bromine, or iodine.

The term "haloalkyl" used herein refers to alkyl in which one or more hydrogen atoms are substituted with halogen atoms. For example, haloalkyl includes —$CF_3$, —$CHF_2$, —$CH_2F$, —$CBr_3$, —$CHBr_2$, —$CH_2Br$, —$CCl_3$, —$CHCl_2$, —$CH_2Cl$, —$CI_3$, —$CHI_2$, —$CH_2I$, —$CH_2$—$CF_3$, —$CH_2$—$CHF_2$, —$CH_2$—$CH_2F$, —$CH_2$—$CBr_3$, —$CH_2$—$CHBr_2$, —$CH_2$—$CH_2Br$, —$CH_2$—$CCl_3$, —$CH_2$—$CHCl_2$, —$CH_2$—$CH_2Cl$, —$CH_2$—$CI_3$, —$CH_2$—$CHI_2$, —$CH_2$—$CH_2I$, and the like. Here, alkyl and halogen are as defined above.

The term "arylalkyl" described in the present disclosure refers to a functional group in which one or more hydrogens of alkyl are substituted with aryl. Here, aryl and alkyl are as defined above.

The term "discharge" described herein refers to a process of deintercalating lithium ions from an anode, and the term "charge" refers to a process of intercalating lithium ions into an anode.

The present disclosure provides an electrolytic solution for a secondary battery capable of significantly improving quick charge characteristics, cycle characteristics, and high-temperature storage characteristics of the secondary battery. The electrolytic solution for a secondary battery of the present disclosure contains
 a lithium salt,
 a non-aqueous organic solvent, and
 a sulfonyl compound represented by the following Chemical Formula 1:

[Chemical Formula 1]

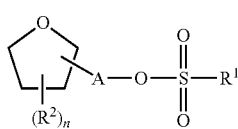

wherein
A is C1-C5 alkylene or C2-C5 alkenylene;
$R^1$ is C1-C10 alkyl, C2-C10 alkenyl, C6-C12 aryl, or C6-C12 aryl C1-C10 alkyl;
$R^2$ is halogen, C1-C5 alkyl, or halo C1-C5 alkyl; and
n is an integer of 0 to 3.

The electrolytic solution for a secondary battery of the present disclosure contains the sulfonyl compound represented by Chemical Formula 1, such that the secondary battery has significantly improved lifespan characteristics, quick charge characteristics, and high-temperature characteristics.

Specifically, the electrolytic solution for a secondary battery of the present disclosure contains the sulfonyl compound having a specific structure, such that a lithium secondary battery employing the same has further improved electrical characteristics.

The sulfonyl compound of the present disclosure has a sulfonyl functional group and a tetrahydrofuranyl group which is a 5-membered ring, such that the secondary battery has improved room temperature capacity retention rate, low-temperature characteristics, and resistance increase rate.

Specifically, the tetrahydrofuranyl group which is a 5-membered ring in the sulfonyl compound of the present disclosure is reduced to form a loose film having relatively reduced resistance on a surface of an anode, such that mobility of lithium ions is increased. Therefore, the secondary battery has significantly improved quick charge characteristics.

In Chemical Formula 1 according to an exemplary embodiment of the present disclosure, A may be C1-C5 alkylene; $R^1$ may be C1-C10 alkyl, C6-C12 aryl, or C6-C12 aryl C1-C10 alkyl; $R^2$ may be fluoro, C1-C5 alkyl, or fluoro C1-C5 alkyl; and n may be an integer of 0 or 1, and more specifically, A may be C1-C3 alkylene; $R^1$ may be C1-C5 alkyl, C6-C8 aryl, or C6-C8 aryl C1-C5 alkyl; $R^2$ may be fluoro, C1-C5 alkyl, or fluoro C1-C5 alkyl; and n may be 0. Specifically, Chemical Formula 1 according to an exemplary embodiment of the present disclosure may be represented by the following Chemical Formula 2:

[Chemical Formula 2]

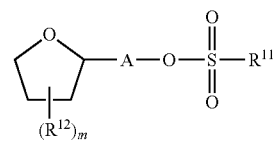

wherein
A is C1-C5 alkylene;
$R^{11}$ is $C_1$—C10 alkyl or C6-C12 aryl C1-C10 alkyl;
$R^{12}$ is halogen, C1-C5 alkyl, or halo C1-C5 alkyl; and
m is an integer of 0 to 3.

Chemical Formula 2 according to an exemplary embodiment of the present disclosure has a 5-membered ring (tetrahydrofuranyl) containing oxygen and a sulfonyl group, such that the secondary battery has excellent quick charge characteristics, in particular, improved high-temperature storage stability.

More specifically, in Chemical Formula 2 according to an exemplary embodiment of the present disclosure, A may be C1-C3 alkylene; $R^{11}$ may be C1-C6 alkyl or C6-C12 aryl C1-C6 alkyl; $R^{12}$ may be fluoro, C1-C5 alkyl, or fluoro C1-C5 alkyl; and m may be an integer of 0 or 1, and more specifically, A may be C1-C3 alkylene; $R^{11}$ may be C1-C6 alkyl; $R^{12}$ may be fluoro, C1-C5 alkyl, or fluoro C1-C5 alkyl; and m may be 0.

More specifically, the sulfonyl compound according to an exemplary embodiment of the present disclosure may be selected from, but is not limited to, the following compounds:

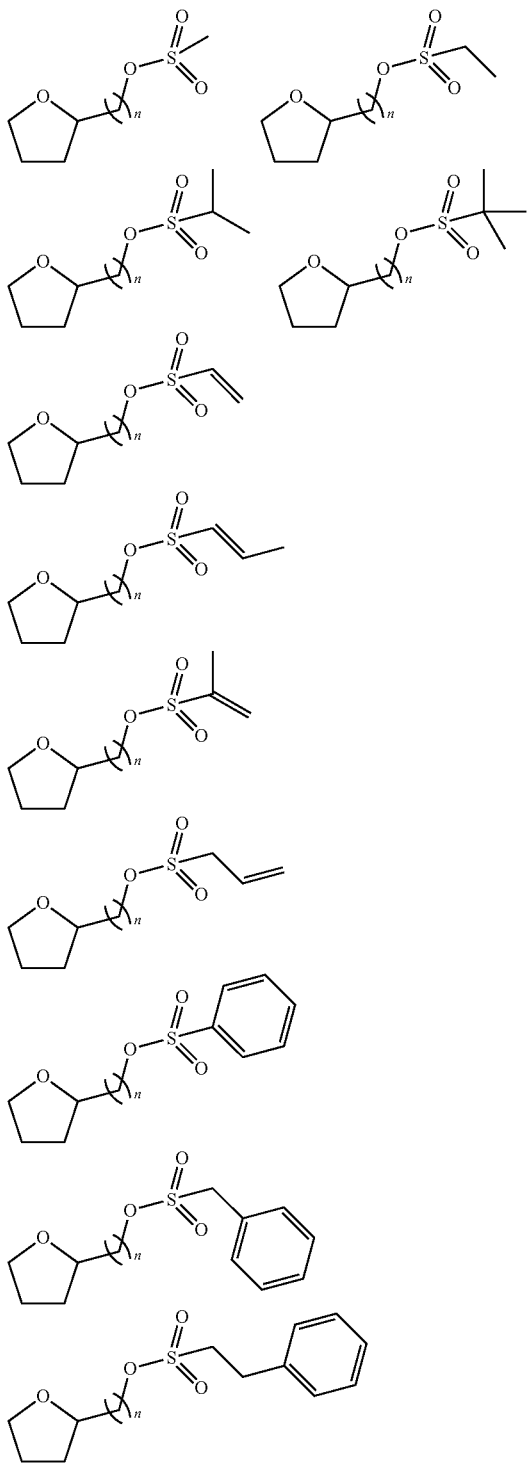

wherein n is an integer of 0 to 5.

The sulfonyl compound according to an exemplary embodiment of the present disclosure may be contained in an amount of 0.1 to 5 wt %, specifically, 0.5 to 5 wt %, and more specifically, 0.5 to 3 wt %, with respect to a total weight of the electrolytic solution.

The electrolytic solution for a secondary battery according to an exemplary embodiment of the present disclosure may further contain a sultone compound represented by the following Chemical Formula 3 and a fluorine-substituted carbonate-based compound as additives:

[Chemical Formula 3]

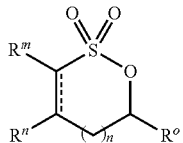

wherein

=== represents a single bond or a double bond;

$R^m$ to $R^o$ are each independently hydrogen, halogen, C1-C10 alkyl, C2-C10 alkenyl, halo C1-C10 alkyl, halo C2-C10 alkenyl, or C6-C12 aryl;

and n is an integer of 0 to 3.

The sultone compound according to an exemplary embodiment of the present disclosure may be one or more selected from ethane sultone, 1,3-propane sultone (PS), 1,4-butane sultone (BS), ethene sultone, 1,3-propene sultone (PRS), 3-fluoro-1,3-propane sultone (FPS), and 1,4-butene sultone. The fluorine-substituted carbonate-based compound may be one or more selected from fluoroethylene carbonate (FEC), difluoroethylene carbonate (DFEC), fluorodimethyl carbonate (FDMC), and fluoroethylmethyl carbonate (FEMC).

The additive according to an exemplary embodiment of the present disclosure may be contained in an amount of 0.1 to 5 wt %, and specifically, 0.1 to 3 wt %, with respect to the total weight of the electrolytic solution for a secondary battery. Specifically, a mixture of three components of the sulfonyl compound, the sultone compound, and the fluorine-substituted carbonate-based compound of the present disclosure is contained, such that the secondary battery has further improved high-temperature characteristics, low-temperature characteristics, lifespan characteristics, and quick charge characteristics.

Any lithium salt used in an electrolytic solution for a secondary battery may be used, and the lithium salt according to an exemplary embodiment of the present disclosure may be one or two or more selected from the group consisting of $LiPF_6$, $LiBF_4$, $LiClO_4$, $LiSbF_6$, $LiAsF_6$, $LiN(SO_3C_2F_5)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$, and specifically, may be one or two or more selected from $LiPF_6$, $LiBF_4$, $LiClO_4$, $LiSbF_6$, and $LiAsF_6$.

In the electrolytic solution for a secondary battery according to an exemplary embodiment of the present disclosure, the lithium salt may be present at a concentration of 0.5 to 2.0 M, and specifically, at a concentration of 0.7 to 1.6 M.

The electrolytic solution for a secondary battery according to an exemplary embodiment of the present disclosure may further contain one or two or more additives selected from the group consisting of an oxalatoborate-based compound, an oxalatophosphate-based compound, and a vinylidene carbonate-based compound.

The oxalatoborate-based compound according to an exemplary embodiment of the present disclosure may be a compound represented by the following Chemical Formula A or lithium bis(oxalato)borate (LiBOB(LiB($C_2O_4$)$_2$)):

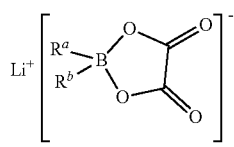
[Chemical Formula A]

wherein $R^a$ and $R^b$ are each independently halogen or halo C1-C10 alkyl.

Specific examples of the oxalatoborate-based compound may include lithium difluoro(oxalato)borate (LiDFOB, (LiB($C_2O_4$)$F_2$)) and lithium bis(oxalato)borate (LiBOB, (LiB($C_2O_4$)$_2$)).

The oxalatophosphate-based compound may be a compound represented by the following Chemical Formula B or lithium difluoro bis(oxalato)phosphate (LiDFBOP, (LiPF$_2$($C_2O_4$)$_2$)):

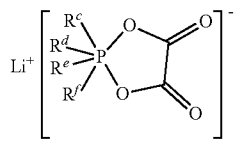
[Chemical Formula B]

wherein $R^c$ to $R^f$ are each independently halogen or halo C1-C10 alkyl.

Specific examples of the oxalatophosphate-based compound may include lithium tetrafluoro(oxalato)phosphate (LiTFOP, (LiPF$_4$($C_2O_4$))) and lithium difluoro bis(oxalato)phosphate (LiDFBOP, (LiPF$_2$($C_2O_4$)$_2$)).

The vinylidene carbonate-based compound may be vinylene carbonate (VC), vinyl ethylene carbonate (VEC), or a mixture thereof.

The electrolytic solution according to an exemplary embodiment of the present disclosure is generally stable in a temperature range of −20° C. to 60° C., and specifically, or 10° C. to 60° C. and electrochemical stability thereof is maintained even at a high voltage of 4.20 V or higher, specifically, 4.30 V or higher, and more specifically, 4.35 V or higher, based on a cathode potential. Therefore, the electrolytic solution may be applied to all the lithium secondary batteries such as a lithium ion battery, and a lithium polymer battery.

Non-limiting examples of the secondary battery according to an exemplary embodiment of the present disclosure may include a lithium metal secondary battery, a lithium ion secondary battery, a lithium polymer secondary battery, and a lithium ion polymer secondary battery.

In addition, the present disclosure provides a lithium secondary battery including the electrolytic solution for a secondary battery of the present disclosure. The lithium secondary battery of the present disclosure includes a cathode including a nickel-cobalt-manganese-based cathode active material containing the following Chemical Formula 11, the following Chemical Formula 12, or a mixture thereof, an anode, a separator interposed between the cathode and the anode, and the electrolytic solution for a secondary battery according to an exemplary embodiment of the present disclosure:

$Li_x(Ni_aCo_bMn_c)O_2$  Chemical Formula 11 wherein 0.5<x<1.3, 0.8≤a<1, 0<b<1, 0<c<1, and a+b+c=1, $Li_x(Ni_aCo_bMn_c)O_4$  Chemical Formula 12 wherein 0.5<x<1.3, 0.8<a<2, 0<b<2, 0<c<2, and a+b+c=2.

The lithium secondary battery of the present disclosure employs a cathode produced using an active material containing a high content of nickel and an electrolytic solution containing a sulfonyl compound having a specific structure, such that the lithium secondary battery may be quickly charged and may have excellent high-temperature characteristics, output characteristics, and lifespan characteristics.

During charging and discharging of the lithium secondary battery, the cathode active material structurally collapses, and metal ions are thus eluted from a surface of the cathode. The eluted metal ions are electrodeposited on the anode to deteriorate the anode. Such a deterioration phenomenon tends to further accelerate when a potential of the cathode is increased or the battery is exposed to a high temperature. In addition, in the lithium secondary battery, in a case where a drive voltage is increased, film decomposition occurs on the surface of the cathode, and the surface of the cathode is thus exposed to an electrolyte, which may cause a side reaction with the electrolyte.

In particular, it is required for an electric vehicle to have a significantly high energy density. In order to solve the problems caused by a high content of Ni generally used for a cathode material when a battery having a high energy density is operated, the lithium secondary battery of the present disclosure employs the electrolytic solution containing a sulfonyl compound represented by Chemical Formula 1, such that the lithium secondary battery has improved battery characteristics.

Specifically, the lithium secondary battery of the present disclosure contains a combination of the electrolytic solution containing a sulfonyl compound represented by Chemical Formula 1 and the specific nickel-cobalt-manganese-based cathode active materials represented by Chemical Formulas 11 and 12, such that the lithium secondary battery may be quickly charged and may have improved lifespan characteristics.

Furthermore, the lithium secondary battery of the present disclosure employing a combination of the specific cathode and the electrolytic solution containing a specific additive may have improved cycle characteristics and output characteristics even at a high temperature and a high voltage.

The cathode active material combined with the electrolytic solution for a secondary battery according to an exemplary embodiment of the present disclosure may be represented by Chemical Formula 11, and in Chemical Formula 11, 0.8 x≤1.0, 0.8≤a<1.0, 0<b<1, 0<c<1, and a+b+c=1. The cathode active material of the present disclosure may be, specifically, $LiNi_{0.8}Co_{0.1}Mn_{0.1}O_2$, $LiNi_{0.88}Co_{0.06}Mn_{0.06}O_2$, $LiNi_{0.90}Co_{0.05}Mn_{0.05}O_2$, or a mixture thereof, more specifically, $LiNi_{0.88}Co_{0.06}Mn_{0.06}O_2$, $LiNi_{0.90}Co_{0.05}Mn_{0.05}O_2$, or a mixture thereof, and still more specifically, $LiNi_{0.88}Co_{0.06}Mn_{0.06}O_2$.

The anode of the lithium secondary battery according to an exemplary embodiment of the present disclosure includes an anode current collector and an anode active material layer formed on the anode current collector. The anode active material layer includes an anode active material capable of intercalating and deintercalating lithium ions. As the anode active material, a carbon material such as crystalline carbon, amorphous carbon, a carbon complex, or a carbon fiber, a lithium metal, or an alloy of lithium with another element may be used. Non-limiting examples of the amorphous carbon include soft carbon (carbon baked at a low temperature), hard carbon, coke, mesocarbon microbead (MCMB) baked at 1,500° C. or lower, and mesophase pitch-based carbon fiber (MPCF). Non-limiting examples of the crystalline carbon include a graphite-based material, specifically, natural graphite, graphitized coke, graphitized MCMB, and graphitized MPCF. The carbon material may be a material of which an interplanar distance is 3.35 to 3.38 Å and a crystallite size (Lc) measured by X-ray diffraction is 20 nm or more. As another element forming an alloy with lithium, aluminum, zinc, bismuth, cadmium, antimony, silicon, lead, tin, gallium, or indium may be used.

The cathode or the anode may be produced by dispersing an active material of each electrode, a binder, and a conductive material, and if necessary, a thickener, in a solvent to prepare an electrode slurry composition, and applying the electrode slurry composition onto an electrode current collector. As a cathode current collector, aluminum, an aluminum alloy, or the like may be mainly used, and as an anode current collector, copper, a copper alloy, or the like may be mainly used. An example of a shape of each of the cathode current collector and the anode current collector may include a foil or mesh shape.

The binder is a material playing a role in paste formation of the active material, adhesion between the active materials, adhesion with the current collector, a buffering effect on expansion and contraction of the active material, and the like. Examples of the binder include polyvinylidene fluoride (PVdF), a polyhexafluoropropylene-polyvinylidene fluoride (PVdF/HFP) copolymer, poly(vinylacetate), polyvinyl alcohol, polyethylene oxide, polyvinylpyrrolidone, alkylated polyethylene oxide, polyvinyl ether, poly(methylmethacrylate), poly(ethylacrylate), polytetrafluoroethylene, polyvinylchloride, polyacrylonitrile, polyvinylpyridine, styrene-butadiene rubber, and acrylonitrile-butadiene rubber. A content of the binder is 0.1 to 30 wt %, and specifically, 1 to 10 wt %, with respect to the electrode active material. A content of the binder is 0.1 to 30 wt % or 1 to 10 wt % with respect to the electrode active material. When the content of the binder is too small, an adhesive force between the electrode active material and the current collector is insufficient, and when the content of the binder is too large, the adhesive force is improved, but a content of the electrode active material is decreased in accordance with the content of the binder, which is disadvantageous in obtaining a battery having a high capacity.

The conductive material is used to impart conductivity to the electrode, and any electronic conductive material may be used as long as it does not cause a chemical change in a battery to be configured. At least one selected from the group consisting of a graphite-based conductive material, a carbon black-based conductive material, and a metal or metal compound-based conductive material may be used. Examples of the graphite-based conductive material include artificial graphite and natural graphite. Examples of the carbon black-based conductive material include acetylene black, ketjen black, denka black, thermal black, and channel black. Examples of the metal or metal compound-based conductive material include tin, tin oxide, tin phosphate ($SnPO_4$), titanium oxide, potassium titanate, and a perovskite material such as $LaSrCoO_3$ or $LaSrMnO_3$. However, the conductive material is not limited thereto.

A content of the conductive material may be 0.1 to 10 wt % with respect to the electrode active material. When the content of the conductive material is less than 0.1 wt %, electrochemical properties deteriorate, and when the content of the conductive material exceeds 10 wt %, an energy density per weight is decreased.

Any thickener may be used without limitation as long as it may serve to adjust a viscosity of the active material slurry, and for example, carboxymethyl cellulose, hydroxymethyl cellulose, hydroxyethyl cellulose, hydroxypropyl cellulose, or the like may be used.

As the solvent in which the electrode active material, the binder, the conductive material, and the like are dispersed, a non-aqueous solvent or an aqueous solvent is used. Examples of the non-aqueous solvent may include N-methyl-2-pyrrolidone (NMP), dimethylformamide, dimethylacetamide, N,N-dimethylaminopropylamine, ethyleneoxide, and tetrahydrofuran.

The lithium secondary battery according to an exemplary embodiment of the present disclosure may include a separator preventing a short circuit between the cathode and the anode and providing a movement path of the lithium ions. As such a separator, a polyolefin-based polymer film formed of polypropylene, polyethylene, polyethylene/polypropylene, polyethylene/polypropylene/polyethylene, or polypropylene/polyethylene/polypropylene, or a multi-layer thereof, a micro-porous film, woven fabric, or non-woven fabric may be used. In addition, a film obtained by coating a resin having excellent stability on a porous polyolefin film may be used.

The lithium secondary battery of the present disclosure may be formed into various shapes such as a cylindrical shape and a pouch shape, in addition to an angular shape. The secondary battery is suitable for use requiring a high voltage, a high output, and driving at a high temperature, such as an electric vehicle, in addition to the existing use for a mobile phone, a portable computer, or the like. In addition, the secondary battery may also be used for a hybrid vehicle in connection with the existing internal combustion engine, fuel cell, super capacitor, or the like, and may be used for all other uses such as an electric bike and a power tool requiring a high output, a high voltage, and driving at a high temperature.

Hereinafter, examples and comparative examples of the present disclosure will be described. However, each of the following examples is merely a preferred example of the present disclosure, and the present disclosure is not limited to the following examples.

[Example 1] Preparation of Tetrahydrofurfuryl Methanesulfonate (THPMS)

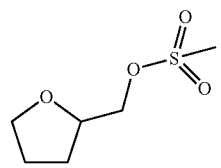

To a round-bottom flask, dichloromethane (50 mL), tetrahydrofurfuryl alcohol (5 g, 49 mmol), and triethylamine (5.5 g, 54 mmol) were added in this order, and the mixture was cooled to 0° C. Methanesulfonyl chloride (3.8 mL, 49 mmol) was slowly added thereto for 2 hours. After the addition was completed, the temperature was raised to room temperature, and the mixture was additionally stirred for 2 hours. After completion of the reaction, a reaction mixture was slowly added dropwise to 50 mL of a saturated NaHCo$_3$ aqueous solution, and an organic layer was separated and then additionally washed twice with 50 mL of distilled water. After the solvent was dried, the separated organic layer was purified by a silica column to obtain 6 g of a light yellow liquid. (yield 68%)

$^1$H-NMR (CDCl$_3$, 600 MHz): 4.19 (m, 1H), 4.11 (m, 2H), 3.82(q, 1H), 3.74(q, 1H), 3.01 (s, 3H), 1.98 (m, 1H), 1.87 (m, 2H), 1.63 (m, 1H)

[Examples 2 and 3] Production of Lithium Secondary Battery

A solution obtained by adding 1 wt % of FEC and 0.5 wt % of PS to a mixed solvent in which ethylene carbonate (EC) and ethyl methyl carbonate (EMC) were mixed in a volume ratio of 25:75, and dissolving LiPF$_6$ in the mixed solvent so that a concentration of the solution was 1.0 M was used as a basic electrolytic solution, and the components shown in Table 1 were additionally added, thereby preparing an electrolytic solution.

A battery to which the non-aqueous electrolytic solution was applied was produced as follows.

LiNi$_{0.88}$Co$_{0.06}$Mn$_{0.06}$O$_2$ as a cathode active material, polyvinylidene fluoride (PVdF) as a binder, and carbon as a conductive material were mixed in a weight ratio of 98:1:1, and then, the mixture was dispersed in N-methyl-2-pyrrolidone, thereby preparing a cathode slurry. The slurry was coated on an aluminum foil having a thickness of 12 μm, and the aluminum foil coated with the slurry was dried and rolled, thereby producing a cathode. Artificial graphite and natural graphite as anode active materials, styrene-butadiene rubber as a binder, and carboxymethyl cellulose as a thickener were mixed in a weight ratio of 96:2:2, and the mixture was dispersed in water, thereby preparing an anode active material slurry. The slurry was coated on a copper foil having a thickness of 8 μm, and the copper foil coated with the slurry was dried and rolled, thereby producing an anode.

A film separator formed of a polyethylene (PE) material and having a thickness of 13 μm was stacked between the prepared electrodes, a cell was configured using a pouch having a size of thickness 5 mm×length 50 mm×width 60 mm, and the non-aqueous electrolytic solution was injected into the pouch, thereby producing a 2 Ah grade lithium secondary battery for EV.

The performance of the 2 Ah grade battery for EV produced described above was evaluated as follows. Evaluation items are as follows.

Comparative Example 1

A lithium secondary battery was produced and evaluated in the same manner as that of Example 2, except that the sulfonyl compound was not added to the electrolytic solution of Example 2 (basic electrolytic solution 1). The results are shown in Table 1.

[Example 4] Production of Lithium Secondary Battery

A solution obtained by adding 2 wt % of FEC and 0.5 wt % of PS to a mixed solvent in which ethylene carbonate (EC) and ethyl methyl carbonate (EMC) were mixed in a volume ratio of 25:75, and dissolving LiPF$_6$ in the mixed solvent so that a concentration of the solution was 1.0 M was used as a basic electrolytic solution, and the components shown in Table 2 were additionally added, thereby preparing an electrolytic solution.

A battery to which the non-aqueous electrolytic solution was applied was produced in the same manner as that of Example 2, and a battery was produced in the same manner as that of Example 2, except that artificial graphite and silicon oxide (weight ratio of 94:6) were used as the anode active materials instead of artificial graphite and natural graphite.

The performance of the 2 Ah grade battery for EV produced described above was evaluated as follows. Evaluation items are as follows and the results are shown in Table 2.

Comparative Example 2

A lithium secondary battery was produced and evaluated in the same manner as that of Example 4, except that the sulfonyl compound of the present disclosure was not added to the electrolytic solution of Example 4 (basic electrolytic solution 2). The results are shown in Table 2.

Evaluation Items

1. Quick charge characteristics: A process of charging the battery to 8% of a state-of-charge (SOC) at room temperature and a current of 0.33 C, charging the battery step-by-step from 2.75 C to 0.75 C in a section of SOC of 8 to 80%, charging the battery at a current of 0.33 C in a section of SOC of 80 to 100%, and discharging the battery to 2.7 V at a current of 0.33 C was repeated 100 times.

2. Room temperature lifespan: A process of charging the battery (CC-CV 0.5 C 4.2 V 0.05 C CUT-OFF) at room temperature and discharging the battery (CC 0.5 C 2.7 V CUT-OFF) was repeated 100 times or more. At this time, the first discharge capacity was defined as 1 C, and a capacity retention rate during the lifespan was calculated by dividing the 1,200$^{th}$ (Table 1) or 300$^{th}$ (Table 2) discharge capacity by the first discharge capacity.

3. Capacity recovery rate after storage at 60° C.: The battery was charged (CC-CV 0.5 C 4.2 V 0.05 C CUT-OFF), the battery was left at 60° C. for 10 weeks (Table 1) or 8 weeks (Table 2), the battery was discharged to 2.7 V at a current of 0.5 C in a CC discharging mode, and then, a discharge capacity was measured to measure a recovery rate (%) relative to the initial capacity.

4. Low-temperature capacity: A process of charging the battery (CC-CV 0.5 C 4.2 V 0.05 C CUT-OFF) at −10° C. and discharging the battery (CC 0.5 C 2.7 V CUT-OFF) was repeated 10 times. The capacity after 10 times of discharging was calculated.

The performance of the battery produced as described above was evaluated by the above evaluation items. The results thereof are shown in Table 1.

TABLE 1

|  | Composition of electrolytic solution | Quick charge capacity retention rate (100 cy, %) | Room temperature lifespan capacity retention rate (1,200 cy, %) | After 10 weeks at 60° C. | | |
|---|---|---|---|---|---|---|
|  |  |  |  | Capacity retention rate (%) | Resistance increase rate (%) | 0.5 C low-temperature capacity (mAh) |
| Example 2 | Basic electrolytic solution 1 + THPMS 0.5 wt % | 94.9 | 85.1 | 83.4 | 114.0 | 1427.1 |
| Example 3 | Basic electrolytic solution 1 + THPMS 1 wt % | 94.0 | 85.2 | 83.2 | 117.9 | 1407.5 |
| Comparative Example 1 | Basic electrolytic solution 1 | 91.1 | 81.1 | 81.3 | 122.5 | 1381.5 |

TABLE 2

|  | Composition of electrolytic solution | Room temperature lifespan capacity retention rate (300 cy, %) | After 8 weeks at 60° C. | | |
|---|---|---|---|---|---|
|  |  |  | Capacity retention rate (%) | Resistance increase rate (%) | 0.5 C. low-temperature capacity (mAh) |
| Example 4 | Basic electrolytic solution 2 + THPMS 0.5 wt % | 93.1 | 85.3 | 141.8 | 1431.9 |
| Comparative Example 2 | Basic electrolytic solution 2 | 88.9 | 76.7 | 168.5 | 1348.3 |

Basic electrolytic solution 1:1 M $LiPF_6$, EC:EMC (25:75) vol %, FEC 1 wt %, PS 0.5 wt %

Basic electrolytic solution 2:1 M $LiPF_6$, EC:EMC (25:75) vol %, FEC 2 wt %, PS 0.5 wt %

From Tables 1 and 2, it could be appreciated that in each of the lithium secondary batteries of Examples 1 to 4 employing the electrolytic solution of the present disclosure containing a sulfonyl compound, the quick charge characteristics and lifespan characteristics were significantly improved compared with the lithium secondary battery of each of Comparative Examples 1 and 2 employing no electrolytic solution of the present disclosure.

In addition, it could be appreciated that in the case of the lithium secondary battery containing the combination of the sulfonyl compound, 1,3-propane sultone, and difluoroethylene carbonate of the present disclosure, the room temperature lifespan capacity retention rate and low-temperature capacity were excellent, and the resistance increase rate was significantly low, which showed that the quick charge characteristics of the lithium secondary battery were significantly improved.

In particular, in the case of the lithium secondary battery employing 1,3-propane sultone (PS) and a quite high content of difluoroethylene carbonate in the basic electrolytic solution (Comparative Example 2), the room temperature capacity retention rate is significantly reduced and the resistance increase rate is also high; however, in the case of the lithium secondary battery of the present disclosure containing the sulfonyl compound in the basic electrolytic solution 2, the room temperature capacity retention rate is significantly improved, the resistance increase rate is significantly reduced, and thus, the quick charge characteristics may be improved.

The electrolytic solution for a secondary battery of the present disclosure contains the sulfonyl compound having a specific structure, such that the secondary battery has excellent lifespan characteristics and significantly improved high-temperature characteristics without a decrease in output even at a high voltage.

In addition, the electrolytic solution for a secondary battery of the present disclosure contains the sulfonyl compound represented by Chemical Formula 1, such that the secondary battery has significantly improved quick charge characteristics.

In addition, the lithium secondary battery of the present disclosure employs the electrolytic solution for a secondary battery of the present disclosure that contains a sulfonyl compound and employs a combination of specific cathode active materials, such that the lithium secondary battery has excellent lifespan characteristics and significantly improved quick charge characteristics without a decrease in output even at a high voltage.

In addition, the lithium secondary battery of the present disclosure employs a combination of the electrolytic solution for a secondary battery that contains a sulfonyl compound and the cathode active material, such that the lithium secondary battery has significantly improved quick charge characteristics and excellent high-temperature stability because the amount of gas generated is small even after long-term storage at a high temperature.

In addition, the lithium secondary battery of the present disclosure has further improved output characteristics and room temperature lifespan characteristics due to reduced battery internal resistance.

Further, the lithium secondary battery of the present disclosure has improved cycle characteristics and stability and excellent quick charge characteristics even during charging and discharging at a high temperature and a high voltage.

Hereinabove, although the exemplary embodiments of the present disclosure have been described in detail, those skilled in the art to which the present disclosure pertains will appreciate that the present disclosure may be variously modified without departing from the spirit and scope of the present disclosure as disclosed in the accompanying claims. Therefore, changes of exemplary embodiments of the present disclosure are intended to fall within the scope of the present disclosure.

What is claimed is:

1. An electrolytic solution for a secondary battery, comprising:
a lithium salt;
a non-aqueous organic solvent;
a sulfonyl compound represented by the following Chemical Formula 1;
a sultone compound represented by the following Chemical Formula 3; and
a fluorine-substituted carbonate-based compound:

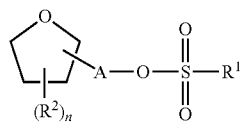
[Chemical Formula 1]

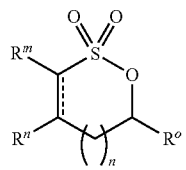
[Chemical Formula 3]

wherein
in the Chemical Formula 1,
A is C1-C5 alkylene or C2-C5 alkenylene;
$R^1$ is C1-C10 alkyl, C2-C10 alkenyl, C6-C12 aryl, or C6-C12 aryl C1-C10 alkyl;
$R^2$ is halogen, C1-C5 alkyl, or halo C1-C5 alkyl; and
n is an integer of 0 to 3,
in the Chemical Formula 3,
=== represents a single bond or a double bond;
$R^m$ to $R^o$ are each independently hydrogen, halogen, C1-C10 alkyl, C2-C10 alkenyl, halo C1-C10 alkyl, halo C2-C10 alkenyl, or C6-C12 aryl; and
n is an integer of 0 to 3.

2. The electrolytic solution of claim 1, wherein
in Chemical Formula 1, A is C1-C5 alkylene; $R^1$ is C1-C10 alkyl, C6-C12 aryl, or C6-C12 aryl C1-C10 alkyl; $R^2$ is fluoro, C1-C5 alkyl, or fluoro C1-C5 alkyl; and n is an integer of 0 or 1.

3. The electrolytic solution of claim 1, wherein
Chemical Formula 1 is represented by the following Chemical Formula 2:

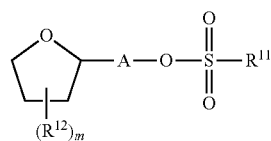
[Chemical Formula 2]

wherein
A is C1-C5 alkylene;
$R^{11}$ is C1-C10 alkyl or C6-C12 aryl C1-C10 alkyl;
$R^{12}$ is halogen, C1-C5 alkyl, or halo C1-C5 alkyl; and
m is an integer of 0 to 3.

4. The electrolytic solution of claim 3, wherein
in Chemical Formula 2, A is C1-C3 alkylene; $R^{11}$ is C1-C6 alkyl or C6-C12 aryl C1-C6 alkyl; $R^{12}$ is fluoro, C1-C5 alkyl, or fluoro C1-C5 alkyl; and m is an integer of 0 or 1.

5. The electrolytic solution of claim 1, wherein
the sulfonyl compound represented by Chemical Formula 1 is selected from the following compounds:

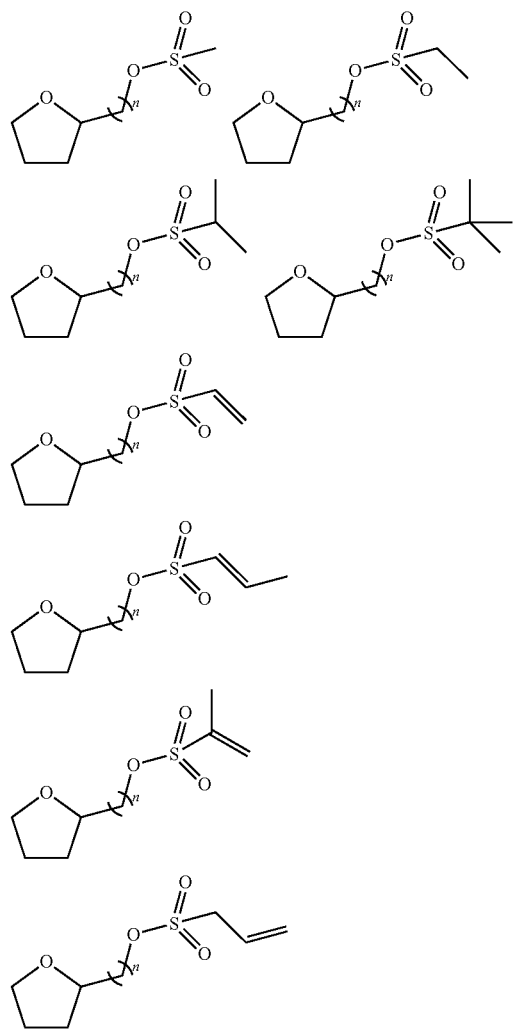

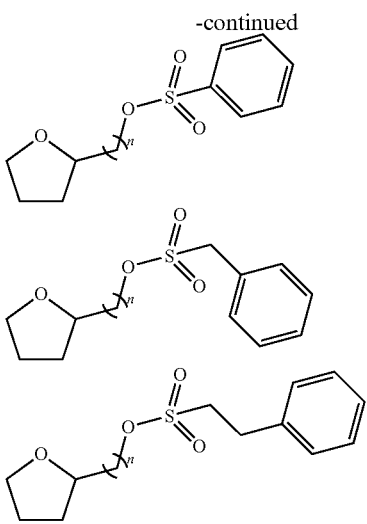

wherein n is an integer of 1 to 5.

6. The electrolytic solution of claim 1, wherein the sulfonyl compound is contained in an amount of 0.1 to 5 wt % with respect to a total weight of the electrolytic solution.

7. The electrolytic solution of claim 1, wherein
the sultone compound is one or more selected from 1,3-propane sultone, 1,4-butane sultone, ethene sultone, 1,3-propene sultone, 3-fluoro-1,3-propane sultone, and 1,4-butene sultone, and the fluorine-substituted carbonate-based compound is one or more selected from fluoroethylene carbonate, difluoroethylene carbonate, fluorodimethyl carbonate, and fluoroethylmethyl carbonate.

8. The electrolytic solution of claim 1, wherein
the sultone compound and fluorine-substituted carbonate-based compound are contained in an amount of 0.1 to 5 wt % with respect to a total weight of the electrolytic solution.

9. The electrolytic solution of claim 1, further comprising one or two or more additives selected from the group consisting of an oxalatoborate-based compound, an oxalatophosphate-based compound, and a vinylidene carbonate-based compound.

10. The electrolytic solution of claim 1, wherein
the lithium salt is one or two or more selected from the group consisting of $LiPF_6$, $LiBF_4$, $LiClO_4$, $LiSbF_6$, $LiAsF_6$, $LiN(SO_3C_2F_5)_2$, $LiCF_3SO_3$, $LiC_4F_9SO_3$, $LiC_6H_5SO_3$, LiSCN, $LiAlO_2$, $LiAlCl_4$, $LIN(C_xF_{2x+1}SO_2)(C_yF_{2y+1}SO_2)$, LiCl, LiI, and $LiB(C_2O_4)_2$,
where x and y are natural numbers.

11. The electrolytic solution of claim 1, wherein
the non-aqueous organic solvent is a mixed solvent of cyclic carbonate and linear carbonate.

12. A lithium secondary battery comprising:
a cathode comprising a nickel-cobalt-manganese-based cathode active material containing the following Chemical Formula 11, the following Chemical Formula 12, or a mixture thereof;
an anode;
a separator interposed between the cathode and the anode; and
the electrolytic solution for a secondary battery of claim 1:

$Li_x(Ni_aCo_bMn_c)O_2$  Chemical Formula 11 wherein $0.5<x<1.3$, $0.8\leq a<1$, $0<b<1$, $0<c<1$, and $a+b+c=1$, $Li_x(Ni_aCo_bMn_c)O_4$  Chemical Formula 12 wherein $0.5<x<1.3$, $0.8<a<2$, $0<b<2$, $0<c<2$, and $a+b+c=2$.

13. The lithium secondary battery of claim 12, wherein the cathode active material is $Li_x(Ni_aCO_bMn_c)O_2$ in which $0.95\leq x\leq 1.10$, $0.8\leq a<0.9$, and $a+b+c=1$.

* * * * *